US011092708B2

(12) United States Patent
Lu et al.

(10) Patent No.: US 11,092,708 B2
(45) Date of Patent: Aug. 17, 2021

(54) PROCESSES AND SYSTEMS TO ENHANCE ILLUMINATION AND RESOLUTION OF SEISMIC IMAGES USING MULTIPLE REFLECTED WAVEFIELDS

(71) Applicant: PGS Geophysical AS, Lysaker (NO)

(72) Inventors: Shaoping Lu, Houston, TX (US); Faqi Liu, Katy, TX (US); Alejandro A. Valenciano Mavilio, Bellaire, TX (US); Nizar Chemingui, Houston, TX (US)

(73) Assignee: PGS Geophysical AS, Oslo (NO)

( * ) Notice: Subject to any disclaimer, the term of this patent is extended or adjusted under 35 U.S.C. 154(b) by 398 days.

(21) Appl. No.: 16/350,083

(22) Filed: Sep. 21, 2018

(65) Prior Publication Data

US 2019/0187313 A1    Jun. 20, 2019

Related U.S. Application Data

(60) Provisional application No. 62/599,640, filed on Dec. 15, 2017.

(51) Int. Cl.
| | |
|---|---|
| *G01V 1/34* | (2006.01) |
| *G01V 1/38* | (2006.01) |
| *G01V 1/36* | (2006.01) |
| *G01V 1/30* | (2006.01) |
| *G01V 1/28* | (2006.01) |

(52) U.S. Cl.
CPC .............. *G01V 1/345* (2013.01); *G01V 1/28* (2013.01); *G01V 1/303* (2013.01); *G01V 1/362* (2013.01); *G01V 1/38* (2013.01); *G01V 2210/32* (2013.01); *G01V 2210/44* (2013.01); *G01V 2210/51* (2013.01)

(58) Field of Classification Search
CPC ...... G01V 2210/51; G01V 1/28; G01V 1/303; G01V 1/345; G01V 1/362; G01V 1/38; G01V 2210/32; G01V 2210/44
See application file for complete search history.

(56) References Cited

U.S. PATENT DOCUMENTS

| | | | | |
|---|---|---|---|---|
| 8,554,484 | B2* | 10/2013 | Van Manen | ......... G01V 1/3808 |
| | | | | 702/14 |
| 9,864,082 | B2* | 1/2018 | Valenciano Mavilio | .................... |
| | | | | G01V 1/28 |
| 2014/0119157 | A1* | 5/2014 | Whitmore, Jr. | ........ G01V 1/362 |
| | | | | 367/11 |

\* cited by examiner

*Primary Examiner* — Elias Desta

(57) ABSTRACT

This disclosure describes processes and systems for generating a seismic image of a subterranean formation from recorded seismic data gathers obtained in a marine seismic survey of the subterranean formation. The seismic data comprises recorded pressure and vertical velocity wavefields that are used to separate the recorded pressure wavefield into upgoing and downgoing pressure wavefields. A seismic image is computed from the subterranean formation based on a product of the downgoing pressure wavefield and a migration operator applied to the upgoing pressure wavefield. The downgoing pressure wavefield is a boundary source wavefield and the upgoing pressure wavefield is boundary receiver wavefield of the migration operator. The seismic image is iteratively updated by computing a residual seismic image based on the upgoing pressure wavefield and adding the residual seismic image to the seismic image. The final seismic image displays increased illumination and reduced crosstalk artifacts compared to conventional seismic imaging techniques.

21 Claims, 15 Drawing Sheets

$$p = \begin{bmatrix} p(\bar{x}^s, \bar{x}_1^r, t) \\ \vdots \\ p(\bar{x}^s, \bar{x}_n^r, t) \\ \vdots \\ p(\bar{x}^s, \bar{x}_N^r, t) \end{bmatrix} \xrightarrow{FT} P = \begin{bmatrix} P(k_{x1}, k_{y1}, \omega | \bar{x}^s, z_1^r) \\ \vdots \\ P(k_{xn}, k_{yn}, \omega | \bar{x}^s, z_n^r) \\ \vdots \\ P(k_{xN}, k_{yN}, \omega | \bar{x}^s, z_N^r) \end{bmatrix}$$

$$v_z = \begin{bmatrix} v_z(\bar{x}^s, \bar{x}_1^r, t) \\ \vdots \\ v_z(\bar{x}^s, \bar{x}_n^r, t) \\ \vdots \\ v_z(\bar{x}^s, \bar{x}_N^r, t) \end{bmatrix} \xrightarrow{FT} V_z = \begin{bmatrix} V_z(k_{x1}, k_{y1}, \omega | \bar{x}^s, z_1^r) \\ \vdots \\ V_z(k_{xn}, k_{yn}, \omega | \bar{x}^s, z_n^r) \\ \vdots \\ V_z(k_{xN}, k_{yN}, \omega | \bar{x}^s, z_N^r) \end{bmatrix}$$

FIG. 6A $$P = \begin{bmatrix} P(k_{x1}, k_{y1}, \omega | \bar{x}^s, z_1^r) \\ \vdots \\ P(k_{xn}, k_{yn}, \omega | \bar{x}^s, z_n^r) \\ \vdots \\ P(k_{xN}, k_{yN}, \omega | \bar{x}^s, z_N^r) \end{bmatrix} \qquad P^{up} = \begin{bmatrix} P^{up}(k_{x1}, k_{y1}, \omega | \bar{x}^s, z_1^r) \\ \vdots \\ P^{up}(k_{xn}, k_{yn}, \omega | \bar{x}^s, z_n^r) \\ \vdots \\ P^{up}(k_{xN}, k_{yN}, \omega | \bar{x}^s, z_N^r) \end{bmatrix}$$

$$V_z = \begin{bmatrix} V_z(k_{x1}, k_{y1}, \omega | \bar{x}^s, z_1^r) \\ \vdots \\ V_z(k_{xn}, k_{yn}, \omega | \bar{x}^s, z_n^r) \\ \vdots \\ V_z(k_{xN}, k_{yN}, \omega | \bar{x}^s, z_N^r) \end{bmatrix} \qquad P^{dn} = \begin{bmatrix} P^{dn}(k_{x1}, k_{y1}, \omega | \bar{x}^s, z_1^r) \\ \vdots \\ P^{dn}(k_{xn}, k_{yn}, \omega | \bar{x}^s, z_n^r) \\ \vdots \\ P^{dn}(k_{xN}, k_{yN}, \omega | \bar{x}^s, z_N^r) \end{bmatrix}$$

FIG. 6B $$P^{up} = \begin{bmatrix} P^{up}\left(k_{x1},k_{y1},\omega\big|\bar{x}^s,z_1^r\right) \\ \vdots \\ P^{up}\left(k_{xn},k_{yn},\omega\big|\bar{x}^s,z_n^r\right) \\ \vdots \\ P^{up}\left(k_{xN},k_{yN},\omega\big|\bar{x}^s,z_N^r\right) \end{bmatrix} \xrightarrow{IFT} p^{up} = \begin{bmatrix} p^{up}\left(\bar{x}^s,\bar{x}_1^r,t\right) \\ \vdots \\ p^{up}\left(\bar{x}^s,\bar{x}_n^r,t\right) \\ \vdots \\ p^{up}\left(\bar{x}^s,\bar{x}_N^r,t\right) \end{bmatrix}$$

607     609

$$P^{dn} = \begin{bmatrix} P^{dn}\left(k_{x1},k_{y1},\omega\big|\bar{x}^s,z_1^r\right) \\ \vdots \\ P^{dn}\left(k_{xn},k_{yn},\omega\big|\bar{x}^s,z_n^r\right) \\ \vdots \\ P^{dn}\left(k_{xN},k_{yN},\omega\big|\bar{x}^s,z_N^r\right) \end{bmatrix} \xrightarrow{IFT} p^{dn} = \begin{bmatrix} p^{dn}\left(\bar{x}^s,\bar{x}_1^r,t\right) \\ \vdots \\ p^{dn}\left(\bar{x}^s,\bar{x}_n^r,t\right) \\ \vdots \\ p^{dn}\left(\bar{x}^s,\bar{x}_N^r,t\right) \end{bmatrix}$$

608     610

FIG. 6C $$d_{obs} = \begin{bmatrix} d_{obs}(\bar{x}^s, \bar{x}_1^r, t) \\ \vdots \\ d_{obs}(\bar{x}^s, \bar{x}_n^r, t) \\ \vdots \\ d_{obs}(\bar{x}^s, \bar{x}_N^r, t) \end{bmatrix} = \begin{bmatrix} L(m_1, d_1) & \cdots & L(m_i, d_1) & \cdots & L(m_M, d_1) \\ \vdots & & \vdots & & \vdots \\ L(m_1, d_j) & \cdots & L(m_i, d_j) & \cdots & L(m_M, d_j) \\ \vdots & & \vdots & & \vdots \\ L(m_1, d_N) & \cdots & L(m_i, d_N) & \cdots & L(m_M, d_N) \end{bmatrix} \begin{bmatrix} m(\bar{x}_1) \\ \vdots \\ m(\bar{x}_i) \\ \vdots \\ m(\bar{x}_M) \end{bmatrix} = Lm$$

FIG. 7A

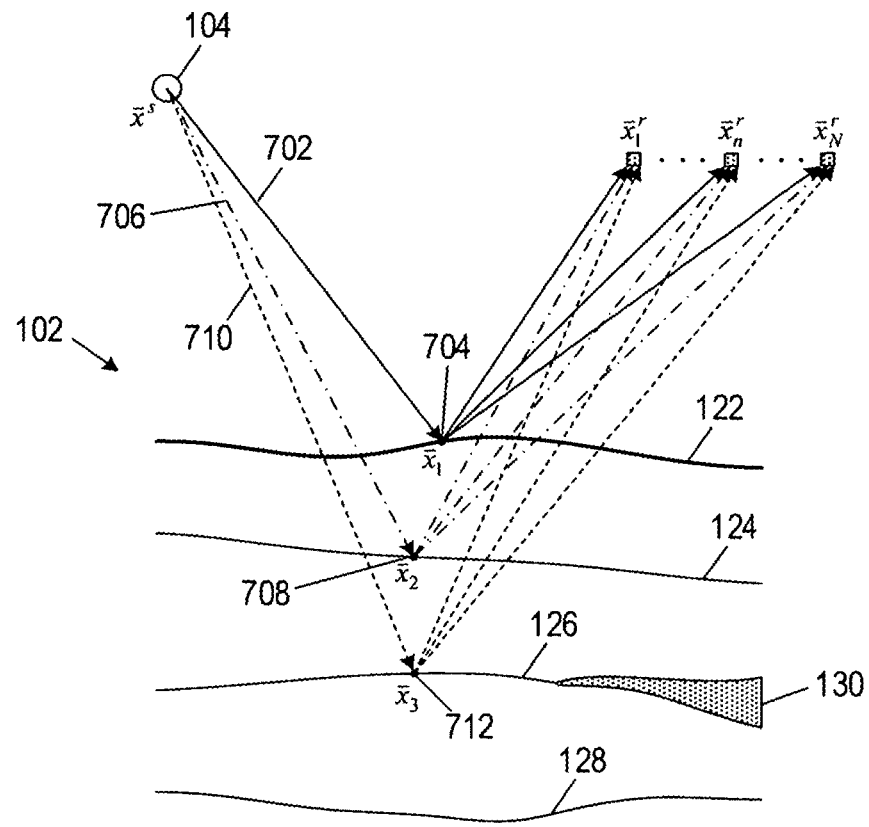

FIG. 7B $$m = \begin{bmatrix} m(\bar{x}_1) \\ \vdots \\ m(\bar{x}_i) \\ \vdots \\ m(\bar{x}_M) \end{bmatrix} = \begin{bmatrix} L^*(m_1,d_1) & \cdots & L^*(m_i,d_j) & \cdots & L^*(m_M,d_N) \\ \vdots & & \vdots & & \vdots \\ L^*(m_i,d_1) & \cdots & L^*(m_i,d_j) & \cdots & L^*(m_M,d_N) \\ \vdots & & \vdots & & \vdots \\ L^*(m_M,d_1) & \cdots & L^*(m_M,d_j) & \cdots & L^*(m_M,d_N) \end{bmatrix} \begin{bmatrix} d_{obs}(\bar{x}^s,\bar{x}_1^r,t) \\ \vdots \\ d_{obs}(\bar{x}^s,\bar{x}_n^r,t) \\ \vdots \\ d_{obs}(\bar{x}^s,\bar{x}_N^r,t) \end{bmatrix} = L^T d_{obs}$$

PROCESSES AND SYSTEMS TO ENHANCE ILLUMINATION AND RESOLUTION OF SEISMIC IMAGES USING MULTIPLE REFLECTED WAVEFIELDS

CROSS-REFERENCE TO A RELATED APPLICATION

This application claims the benefit of Provisional Application 62/599,640, filed Dec. 15, 2017, which application is hereby incorporated by reference entirely as if fully set forth herein.

BACKGROUND

Marine seismology companies invest heavily in the development of marine seismic surveying equipment and seismic data processing techniques to obtain accurate, high-resolution seismic images of subterranean formations located beneath a body of water. High-resolution seismic images of a subterranean formation are used to reveal the geological structure of subterranean formations, discover petroleum reservoirs, and monitor petroleum reservoirs during production. A typical marine seismic survey is carried out with one or more survey vessels that tow one or more seismic sources and numerous streamers through the body of water. The survey vessel contains seismic acquisition equipment, such as navigation control, seismic source control, seismic receiver control, and recording equipment. The seismic source control controls activation of the one or more seismic sources at selected times or locations. A seismic source typically comprises an array of source elements, such as air guns, that are activated to produce an acoustic impulse. The acoustic impulse is a sound wave that spreads out in all directions. A portion of the impulse that travels down through the water and into a subterranean formation propagates as a sound wave within the subterranean formation. At each interface between different types of rock and sediment, a portion of the sound wave is refracted, a portion is transmitted, and another portion is reflected into the body of water to propagate toward the water surface. The streamers are elongated cable-like structures towed behind a survey vessel in the direction the survey vessel is traveling (i.e., in-line direction) and are typically arranged substantially parallel to one another. Each streamer contains seismic receivers or sensors that detect pressure and/or particle motion wavefields of the sound waves reflected into the water from the subterranean formation. The streamers collectively form a seismic data acquisition surface. The pressure and/or particle motion wavefields are recorded as seismic data.

DESCRIPTION OF THE DRAWINGS

FIGS. 6A-6C show wavefield separation carried out on a gather of pressure data.

FIG. 7A shows an expanded matrix representation of a modeling operator.

FIG. 7B shows coordinate locations of a source, receivers, and three reflection points within a subterranean formation.

FIG. 8 shows an expanded matrix representation of a migration operator.

DETAILED DESCRIPTION

Figure 1A:
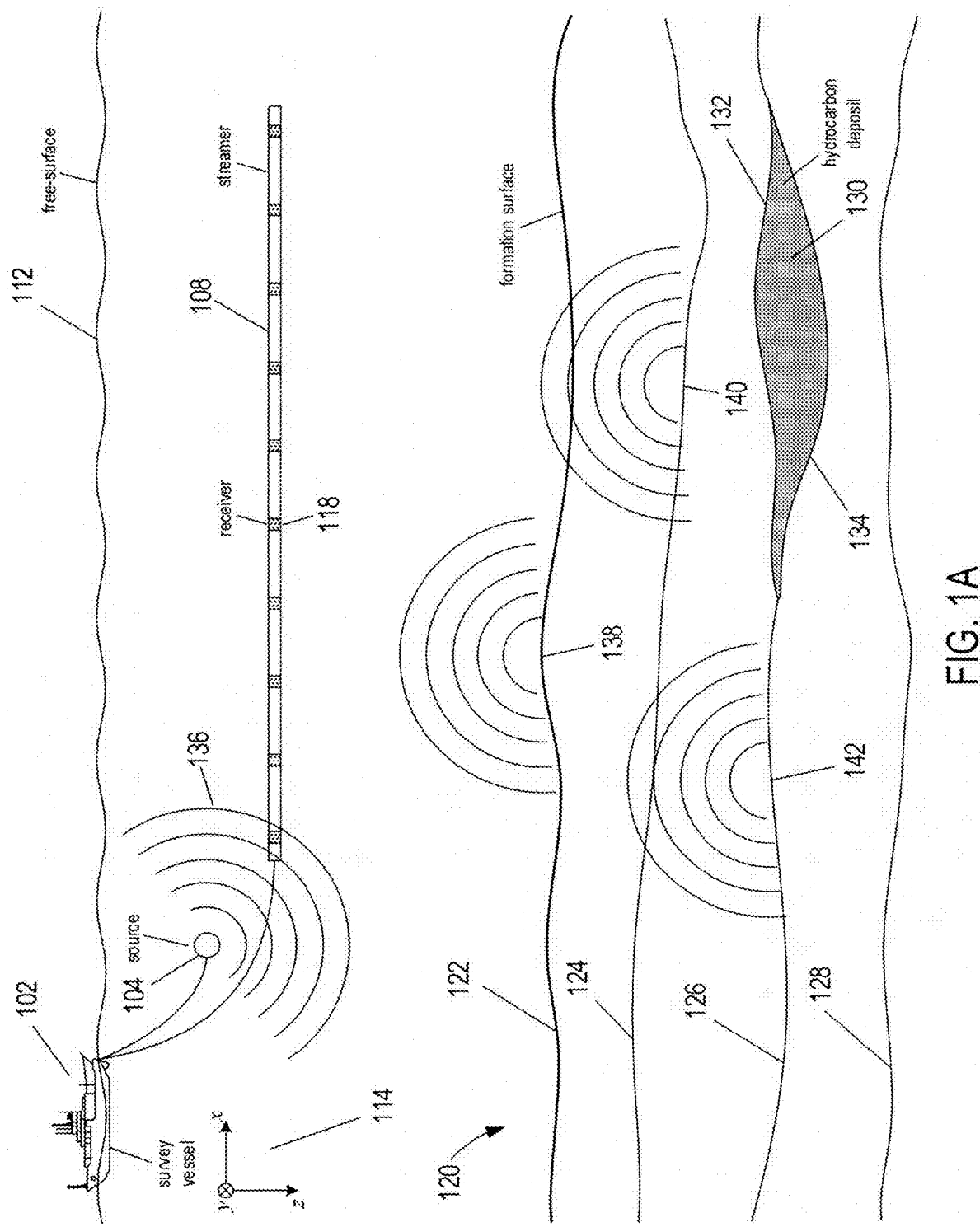
FIGS. 1A-1B show side-elevation and top views of an example seismic data acquisition system.

Numerous seismic data processing techniques have been developed in recent years to enhance illumination and resolution of seismic images produced from recorded seismic data. Standard band-limited depth migration of seismic data containing only primary reflections typically yields insufficient illumination and resolution. Recent efforts to improve seismic image resolution have included seismic data acquisition strategies that generate seismic data with a broader bandwidth. (See, e.g., D. Carlson, A. Long, W. Söllner, H. Tabti, R. Tenghamn, and N. Lunde, *Increased resolution and penetration from towed dual-sensor streamer*, pp. 71-77, First Break vol. 25, December 2007.) Furthermore, full-waveform inversion ("FWI") has been applied to the seismic data to facilitate high-definition earth models that enable high-resolution depth imaging. Wavefield distortions resulting from complex geology of a subterranean formation, however, remain unresolved.

In recent years, separated-wavefield imaging ("SWIM") has been developed to image subterranean formations using separated up-going and down-going wavefields. (See e.g., S. Lu, D. Whitmore, A. Valenciano, and N. Chemingui, *Separated-wavefield imaging using primary and multiple energy*, pp. 770-778, The Leading Edge, vol. 34, no. 7, 2015). Standard migration of primaries and SWIM are complementary processing techniques that can be used to supplement the imaging process. Full-wavefield migration ("FWM") has been developed to generate seismic images using primary and high-order reflected energy recorded in the seismic data. However, SWIM and FWM do not resolve inadequate illumination, poor resolution, and crosstalk contamination of seismic images. Deconvolution imaging condition and crosstalk prediction have been developed to attenuate crosstalk in SWIM. However, neither technique resolves the problem of inadequate illumination and poor resolution. (See e.g., S. Lu, D. Whitmore, A. Valenciano, N. Chemingui, and G. Ronholt, *A practical crosstalk attenuation method for separated wavefield imaging:* 86th Annual International SEG, pp. 4235-4239, Extended Abstracts, 2016).

This disclosure presents processes and systems that generate seismic images of a subterranean formation from recorded pressure and vertical velocity wavefield data obtained in a marine seismic survey of the subterranean formation. The recorded pressure wavefield is separated into an upgoing pressure wavefield and a downgoing pressure wavefield based on the recorded pressure wavefield and the recorded vertical velocity wavefield. A seismic image of the subterranean formation is computed as a product of the downgoing pressure wavefield and a migration operator applied to the upgoing pressure wavefield. The downgoing pressure wavefield is a boundary source wavefield and the upgoing pressure wavefield is a boundary receiver wavefield of the migration operator. The seismic image is iteratively updated by computing a residual seismic image based on the upgoing pressure wavefield and adding the residual seismic image to the seismic image. A final updated seismic image displays increased illumination, improved resolution, and reduced crosstalk artifacts compared to conventional seismic imaging techniques.

Figure 1B:
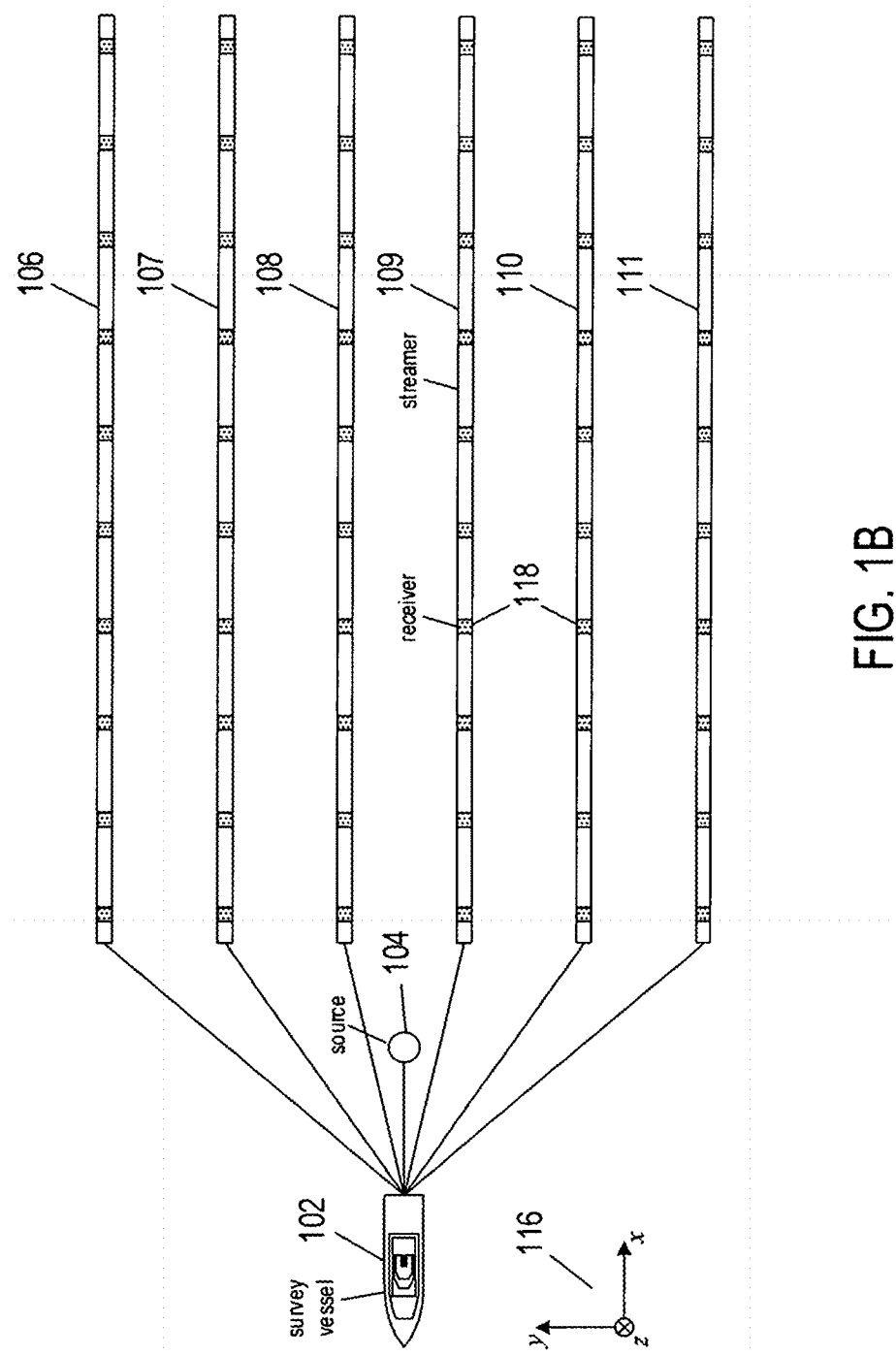

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers or to the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. In other implementations buoys may be attached to the streamers and used to maintain the orientation and depth of the streamers below the free surface 112.

FIG. 1A shows the survey vessel 102 towing the source 104 above a subterranean formation 120. Curve 122, the formation surface, represents a top surface of the subterranean formation 120 located at the bottom of the body of water. The subterranean formation 120 may have subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector or reflection point that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as reflection point 138, and from reflection points on or very close to interfaces in the subterranean formation 120, such as reflection points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the reflection point 138, may receive a pressure disturbance from the source wavefield more quickly than a point within the subterranean formation 120, such as reflection points 140 and 142. Similarly, a reflection point on the formation surface 122 directly beneath the source 104 may receive the pressure disturbance sooner than a more distant-lying reflection point on the formation surface 122. Thus, the times at which waves are reflected from various reflection points within the subterranean formation 120 may be related to the distance, in three-dimensional space, of the reflection points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Each receiver 118 may be a multi-component sensor including particle motion sensors and a pressure sensor. A pressure sensor detects variations in water pressure over time. The term "particle motion sensor" refers to a sensor that may be configured to detect particle displacement, particle velocity, or particle acceleration over time. Each pressure sensor and particle motion sensor may include an analog-to-digital converter that converts time-dependent analog signals into discrete time series that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source and into the subterranean formation where a portion of the acoustic energy is reflected and/or refracted, and ultimately detected by a sensor. In general, each trace is an ordered set of discrete spatial and time-dependent pressure or particle motion sensor amplitudes denoted by:

$$tr(\vec{x}^s, \vec{x}^r, t) = \{A(\vec{x}^s, \vec{x}^r, t_i)\}_{i=0}^{J-1} \quad (1)$$

where
tr represents a trace of pressure, particle displacement, particle velocity, or particle acceleration data;
t represents time;
$\vec{x}^r$ represents the Cartesian coordinates $(x^r, y^r, z^r)$ of a receiver;
$\vec{x}^s$ represents the Cartesian coordinates $(x^s, y^s, z^s)$ of the source 104;
A represents pressure, particle displacement, particle velocity, or particle acceleration amplitude;
$t_i$ is the i-th sample time; and
J is the number of time samples in the trace.

The coordinate location $\vec{x}^r$ of each receiver may be calculated from global position information obtained from one or more global positioning devices located along the streamers, survey vessel, and buoys and the known geometry and arrangement of the streamers and receivers. The coordinate location $\vec{x}^s$ of the source 104 may also be obtained from one or more global positioning devices located at each source and the know geometry and arrangement of source elements of the source 104. Each trace also includes a trace header not represented in Equation (1) that identifies the specific receiver that generated the trace, receiver and source GPS spatial coordinates, and may include time sample rate and the number of time samples.

Figure 2:
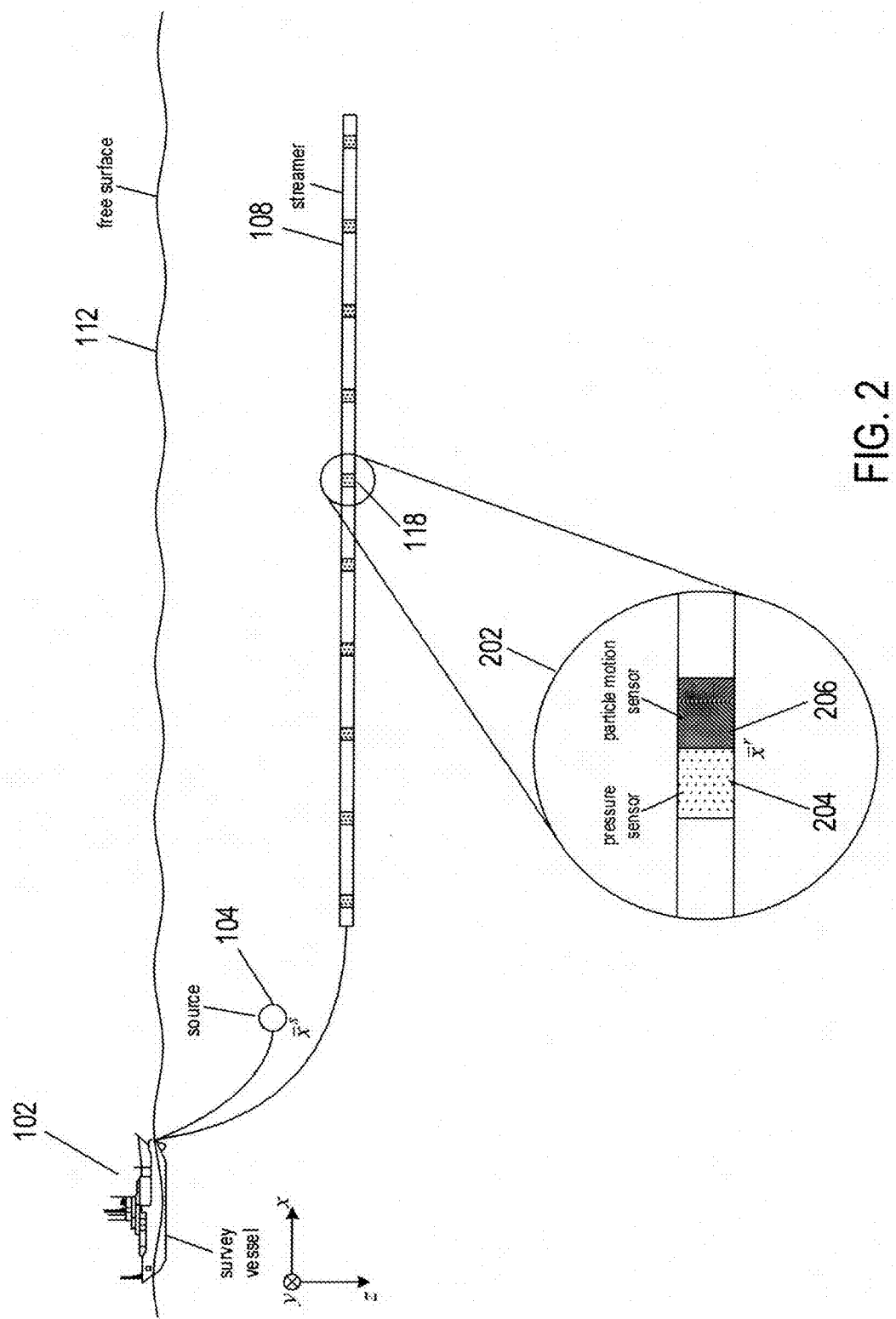
FIG. 2 shows a side-elevation view of a seismic data acquisition system with a magnified view of a receiver.

FIG. 2 shows a side-elevation view of the marine seismic data acquisition system with a magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce a trace of pressure data denoted by $p(\vec{x}^s, \vec{x}^r, t)$. The particle motion sensors may be responsive to water motion. The particle motion sensors are directional sensors that detect particle motion (i.e., displacement, velocity, or acceleration) in a particular direction and may be responsive to such directional displacement of the particles, velocity of the particles, or acceleration of the particles. A particle motion sensor that measures particle displacement produces a trace of particle displacement data denoted by $g_{\vec{n}}(\vec{x}^s, \vec{x}^r, t)$, where the vector $\vec{v}$ represents the direction along which particle displacement is measured. A particle motion sensor that measures particle velocity (i.e., particle velocity sensor) generates a trace of particle velocity data denoted by $v_{\vec{n}}(\vec{x}^s, \vec{x}^r, t)$. A particle motion sensor that measures particle acceleration (i.e., accelerometer) generates a trace of particle acceleration data denoted by $a_{\vec{n}}(\vec{x}^s, \vec{x}^r, t)$. The data generated by one type of particle motion sensor may be converted to another type. For example, particle displacement data may be differentiated to obtain particle velocity data, and particle acceleration data may be integrated to obtain particle velocity data.

The term "particle motion data" refers to particle displacement data, particle velocity data, or particle acceleration data. The term "seismic data" refers to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n} = (0, 0, z)$) in which case $g_z(\vec{x}^s, \vec{x}^r, t)$ is called vertical displacement data, $v_z(\vec{x}^s, \vec{x}^r, t)$ is called vertical velocity data, and $a_z(\vec{x}^s, \vec{x}^r, t)$ is called vertical acceleration data. Alternatively, each receiver 118 may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver 118 may include a pressure sensor and three particle motion sensors that measure particle motion in three orthogonal directions. For example, in addition to having a particle motion sensor that measures particle velocity in the z-direction to give $v_z(\vec{x}^s, \vec{x}^r, t)$, each receiver may include a particle motion sensor that measures the wavefield in the in-line direction in order to obtain the in-line velocity data, $v_x(\vec{x}^s, \vec{x}^r, t)$, and a particle motion sensor that measures the wavefield in the cross-line direction in order to obtain the cross-line velocity data, $v_y(\vec{x}^s, \vec{x}^r, t)$. In certain implementations, the receivers may be only pressure sensors, and in other implementations, the receivers may be only particle motion sensors. The three orthogonal velocity data sets form a velocity vector $\vec{v} = (v_x, v_y, v_z)$.

The streamers 106-111 and the survey vessel 102 may include sensing electronics and data-processing facilities that allow seismic data generated by each receiver to be correlated with the location of the source 104, absolute positions on the free surface 112, and absolute three-dimensional positions with respect to an arbitrary three-dimensional coordinate system. The pressure data and particle motion data may be stored at the receiver, and/or may be sent along the streamers in data transmission cables to the survey vessel 102, where the seismic data may be stored on data-storage devices located onboard the survey vessel 102 and/or transmitted onshore to a seismic data-processing facility.

As explained above, the reflected wavefield typically arrives first at the receivers located closest to the sources. The distance from the sources to a receiver is called the "source-receiver offset," or simply "offset." A larger offset generally results in a longer arrival time delay. Traces are sorted according to different source and receiver locations and are collected to form "gathers" that can be further processed using various seismic data processing techniques to obtain information about the structure of the subterranean formation. The traces may be sorted into different domains such as, for example, a common-shot domain, common-receiver domain, common-receiver-station domain, and common-midpoint domain. A collection of traces sorted into the common-shot domain is called a common-shot gather. A collection of traces sorted into common-receiver domain is called a common-receiver gather.

The portion of the acoustic signal that is reflected into the body of water from the subterranean formation and that travels directly to the receivers is called a primary reflected wavefield or simply a "primary." Other portions of the acoustic signal reflected into the body of water may be reflected a number of times between the free surface and interfaces within the subterranean formation before reaching the receivers. These multiply reflected wavefields are called "multiples."

Figure 3A:
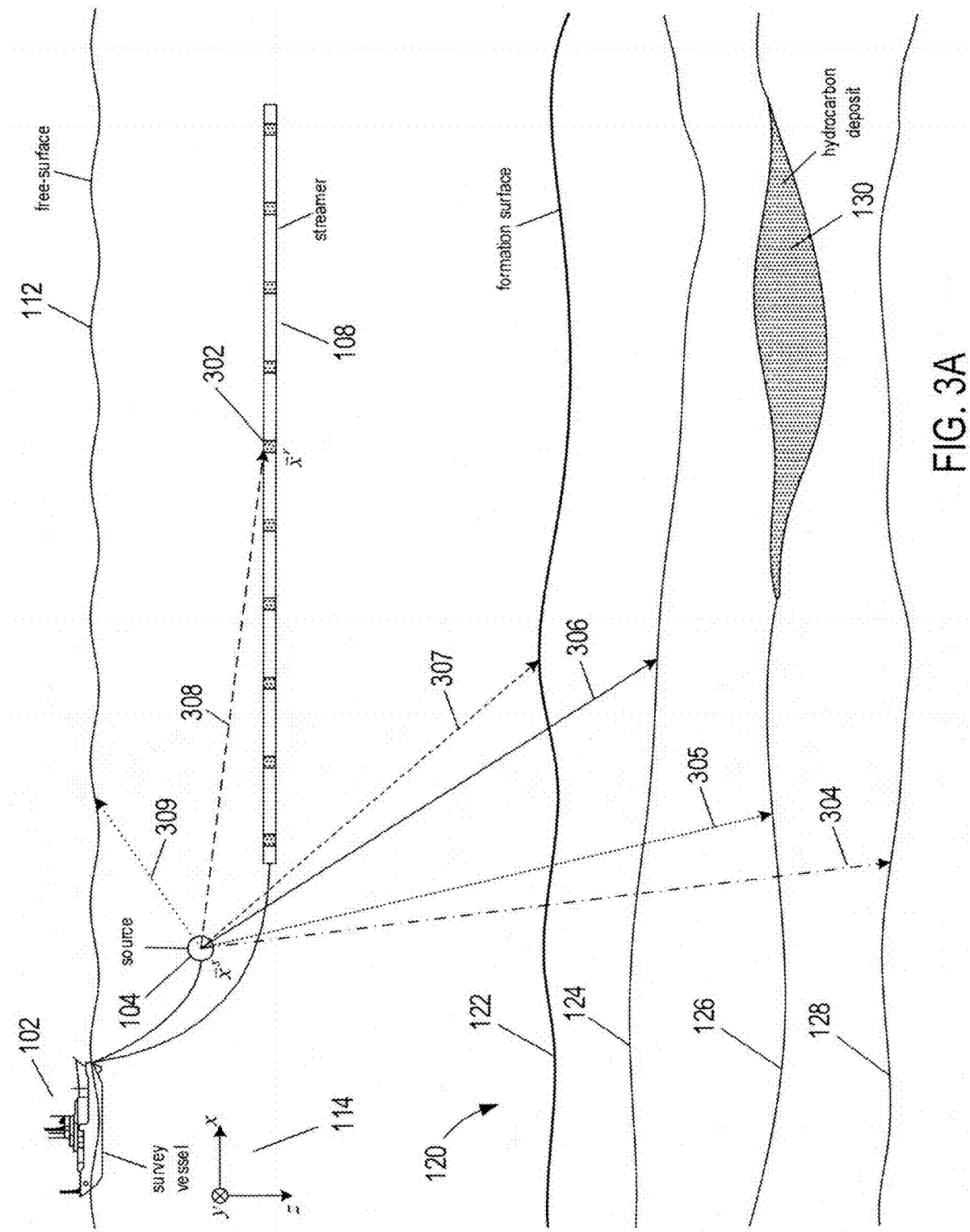
FIGS. 3A-3C show example ray paths of primary and multiple reflections of acoustic energy between a subterranean formation and a free surface of a body of water.
Figure 3B:
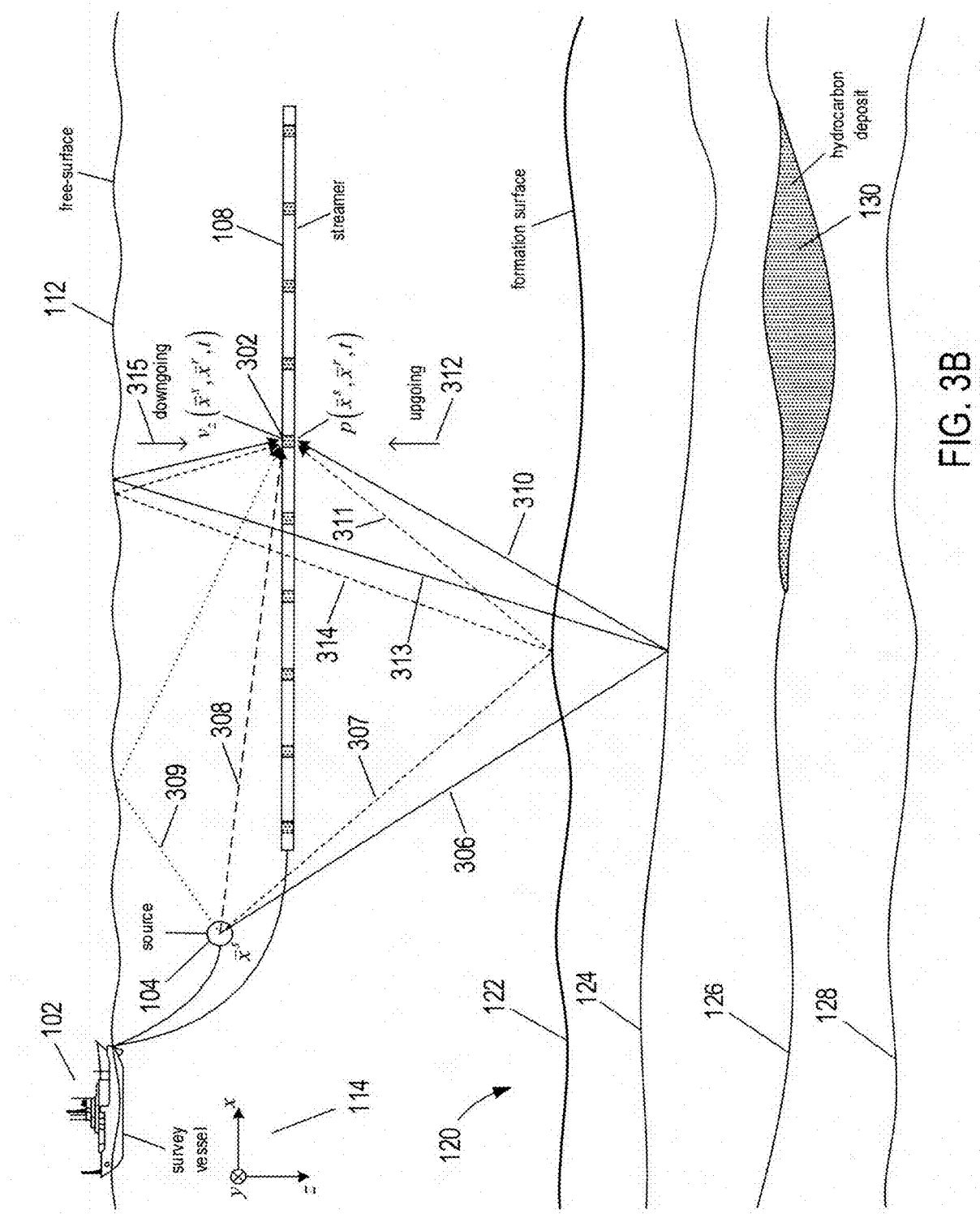
Figure 3C:
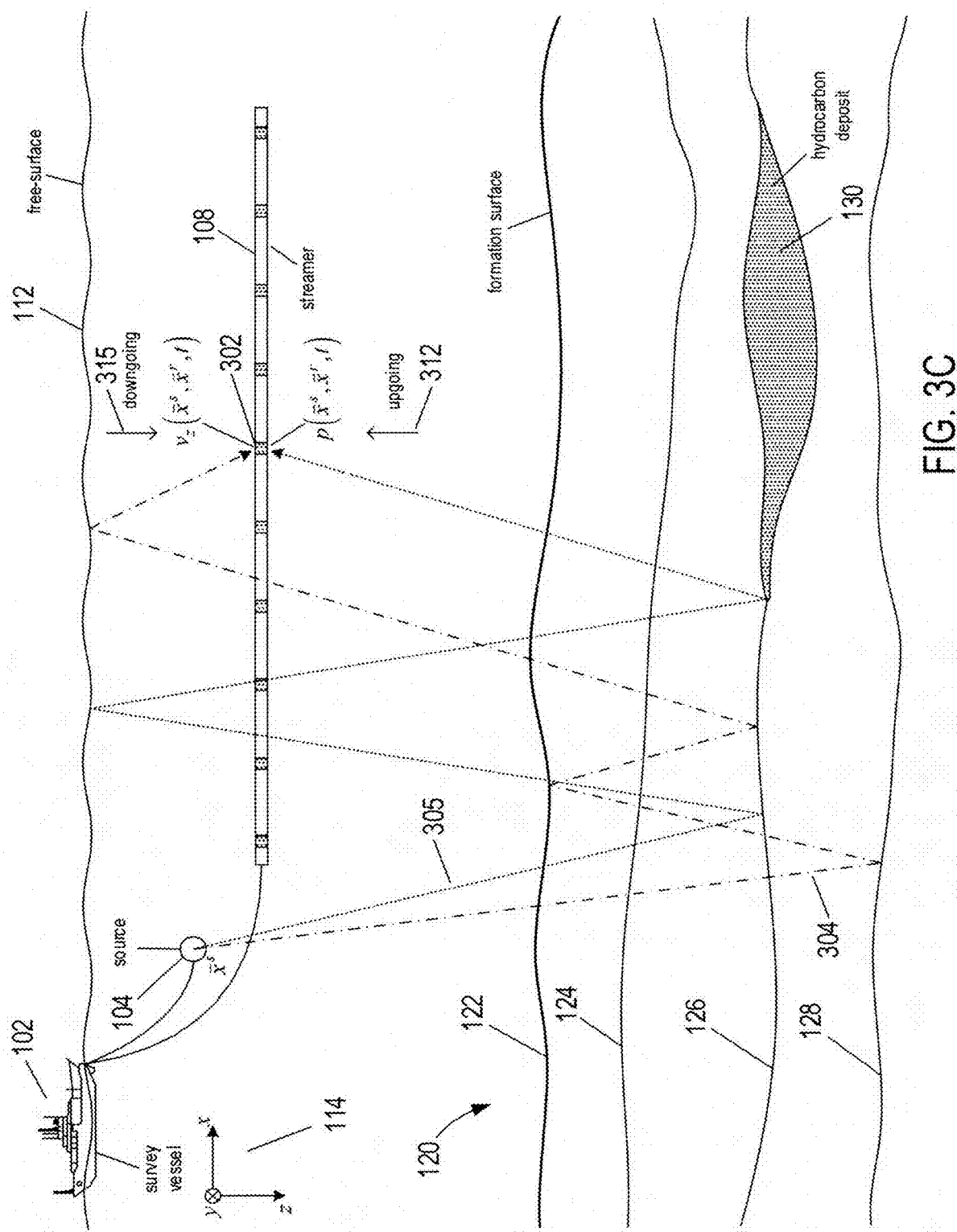

FIGS. 3A-3C show side elevation views of different example ray paths of primary and multiple reflections of acoustic energy between the free surface 112 and the subterranean formation 120 before reaching a receiver 302 of the streamer 108. In FIG. 3A, differently patterned directional arrows 304-309 represent ray paths of different portions of a source signal generated by the source 104. Note that for ease of illustration, ray paths do not include refractions at interfaces. Ray paths 304-307 represent different portions of acoustic energy of the source signal that penetrate to different interfaces of the subterranean formation 102. Ray path 308 represents a portion of the acoustic energy that travels directly to the receiver 302. Ray path 309 represents a portion of the acoustic energy that reaches the free surface 112. In FIG. 3B, ray paths 310 and 311 represent portions of acoustic energy reflected from the interface 124 and the formation surface 122, respectively, to the receiver 302, which are called "upgoing primaries" as indicated by upgoing directional arrow 312. Ray paths 313 and 314 represent portions of acoustic energy reflected from the interface 124 and the formation surface 122 followed by reflections from the free surface 112 to the receiver 302, which are called "downgoing reflections" as indicated by directional arrow 315. In FIG. 3C, ray paths 304 and 305 are extended to represent multiple reflections between interfaces within the subterranean formation 120 and the free surface 112. Ray path 304 represent a downgoing multiple as represented by directional arrow 315. Ray path 302 represents an upgoing multiple as represented by directional arrow 312.

Each trace records the primaries and multiples. The pressure wavefield $p(\vec{x}^s, \vec{x}^r, t)$ and the vertical velocity wavefield $v_z(\vec{x}^s, \vec{x}^r, t)$ record both upgoing and downgoing pressure and vertical velocity wavefields that reach the receivers. For example, pressure wavefield $p(\vec{x}^s, \vec{x}^r, t)$ generated at the receiver 302 records the primary and multiple reflections, and vertical velocity wavefield $v_z(\vec{x}^s, \vec{x}^r, t)$ also generated at the receiver 302 records the primary and multiple reflections.

Figure 4:
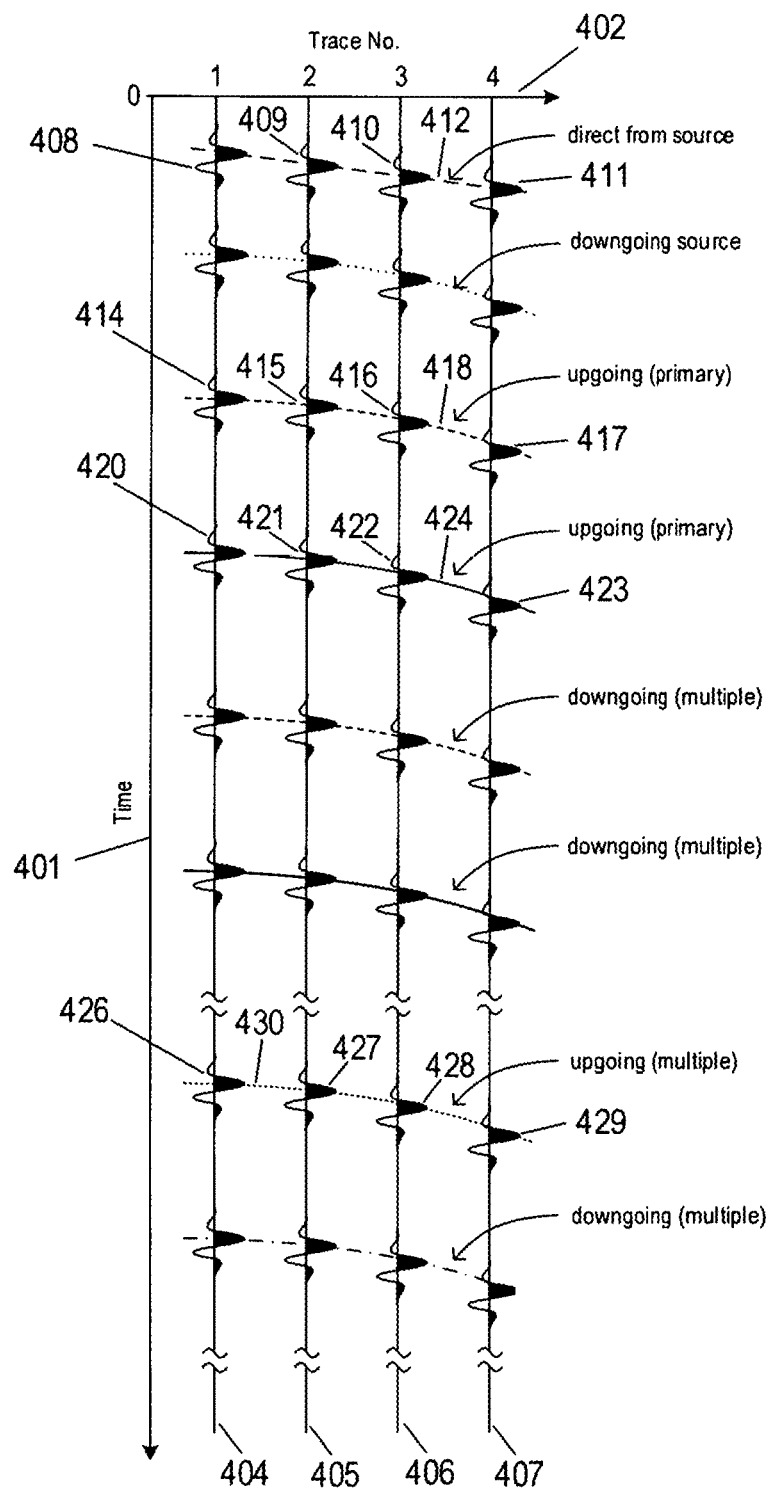
FIG. 4 shows a common-shot gather of reflected wavefields measured by four adjacent receivers located along a streamer.

FIG. 4 shows an example common-shot gather 400 of four example traces of reflected wavefields measured by four adjacent receivers located along the streamer 108 shown in FIGS. 3A-3C. Vertical axis 401 represents time. Horizontal axis 402 represents channels or trace numbers with trace "1" representing a trace of seismic data generated by a receiver located closer to the source 104 than trace "4" representing a trace of seismic data generated by a receiver located farther away from the source 104. The distances along the traces 404-407 from time zero to the locations of the wavelets represent the travel times of the acoustic energy output from the source 104 that eventually reaches the receivers located along the streamer 108. The traces 404-407 may represent the pressure wavefield or the particle motion data measured by four adjacent receivers of the streamer 108. The example traces may record changes in pressure that represent reflection events from the surface and interfaces of the subterranean formation 120 as represented by ray paths shown in FIGS. 3A-3C. For example, wavelets 408-411 located along long dashed curve 412 represent a portion of the acoustic signal generated by the source 104 that travels directly to the receivers as represented by the ray path 308 in FIG. 3A. Wavelets 414-417 located along dashed curve 418 represent changes in pressure that correspond to a portion of the acoustic signal reflected upward from the formation surface 122 as represented by ray path 311 in FIG. 3B. Wavelets 420-423 located along solid curve 424 represent changes in pressure that correspond to a portion of the acoustic signal that is reflected upward from the interface 124 as represented by ray path 310 in FIG. 3B. The reflection events 414-417 and 420-423 represent the upgoing primary wavefield. The reflection events recorded at later times represent upgoing and downgoing multiples. For example, wavelets 426-429 located along dotted curve 430 represent changes in pressure that correspond to a portion of the acoustic signal that is reflected from the free surface 112 and twice from the interface 126 before traveling upward to the receiver 302 as represented by dotted-line ray path 305 in FIG. 3C. Note that for the sake of simplicity of illustration the example traces 404-407 only record a small number of the primaries and multiples and do not record various types of noise that are typically recorded during a marine seismic survey, such as shot noise, swell noise, barnacle noise, streamer vibration, and bird noise.

Figure 5:
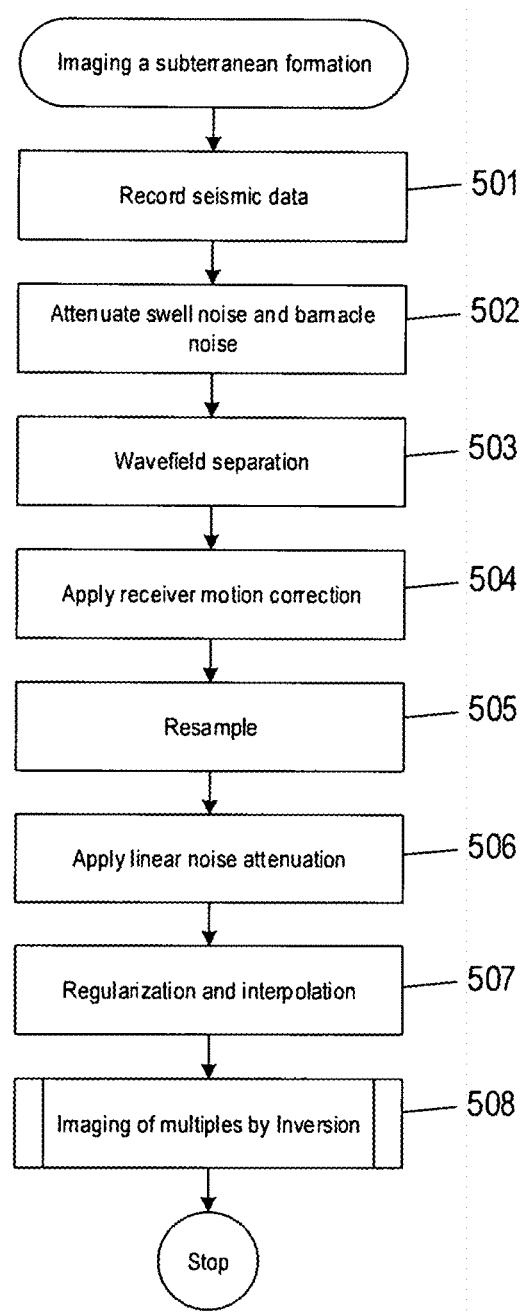
FIG. 5 shows a process for generating a seismic image of a subterranean formation from recorded seismic data.

Processes and systems described below are directed to seismic imaging of multiples by inversion. FIG. 5 shows a process for generating a seismic image of a subterranean formation from recorded seismic data collected in a marine seismic survey of the subterranean formation. Each block represents a different module of computer implemented machine-readable instructions stored in one or more data-storage devices and executed using one or more processors of a computer system. Processing of recorded seismic data to generate an image of a subterranean formation may include additional modules or certain modules may be omitted or executed in a different ordering, depending on how the recorded seismic data is collected, conditions under which the recorded seismic data is collected, and depth of the body of water above the subterranean formation.

In FIG. 5, block 501 represents recording seismic data as described above with reference to FIGS. 1A-3. The recorded seismic data may be pressure and particle motion data recorded using receivers configured with collocated pressure and particle motion sensors. In block 502, swell noise and barnacle noise in the recorded seismic data is attenuated. In block 503, wavefield separation is used to separate the pressure wavefield into upgoing and downgoing pressure wavefields.

For example, FIGS. 6A-6C show wavefield separation carried out on a gather of pressure data, using velocity data. In FIG. 6A, a gather of pressure data 601, denoted by p, and a gather of vertical velocity data 602, denoted by $v_z$, at the same source and receiver coordinates are represented as column vectors. Each element of the pressure data gather 601 is a trace of pressure data recorded at a source and receiver location, each trace generated by one of N pressure sensors. Each element of the vertical velocity gather 602 is a trace of vertical velocity data recorded by one of N particle motion sensors located at the same source and receiver locations as the pressure sensors. The subscript n is a receiver index, where n=1, ..., N. For example, pressure data 603 and vertical velocity data 604 represent traces of pressure and vertical velocity data recorded by collocated pressure and particle motion sensors at a receiver location $\vec{x}_n^r$. Each element of pressure data in the pressure data gather 601 is transformed from the space-time domain to the frequency-wavenumber domain to obtain a gather of pressure data 605 denoted by P, where $\omega$ is the angular frequency and $k_{xn}$, and $k_{yn}$ are the in-line and cross-line wavenumbers. Each element of vertical velocity data in the vertical velocity data gather 602 is transformed from the space-time domain to the frequency-wavenumber domain to obtain a gather of vertical velocity data 606 denoted by $V_z$.

In FIG. 6B, a gather of upgoing pressure data 607, denoted by $P^{up}$, and a gather of downgoing pressure data 608, denoted by $P^{dn}$, are represented as column vectors and formed from the pressure data and vertical velocity data elements of pressure data vector 605 and vertical velocity data vector 606. Each upgoing pressure data element of the gather of upgoing pressure data 607 is given by:

$$P^{up}(k_{xn}, k_{yn}, \omega | \vec{x}^s, z_n^r) = \frac{1}{2}\left(P(k_{xn}, k_{yn}, \omega | \vec{x}^s, z_n^r) - \frac{\omega\rho}{k_{zn}}V_z(k_{xn}, k_{yn}, \omega | \vec{x}^s, z_n^r)\right) \quad (2a)$$

where
$\rho$ is the density of water;

$$k_{zn} = \sqrt{\frac{\omega^2}{c^2} - k_{xn}^2 - k_{yn}^2};$$

and
c is the speed of sound in the body of water.
Each downgoing pressure data element of the gather of downgoing pressure data 608 is given by:

$$P^{dn}(k_{xn}, k_{yn}, \omega | \vec{x}^s, z_n^r) = \frac{1}{2}\left(P(k_{xn}, k_{yn}, \omega | \vec{x}^s, z_n^r) + \frac{\omega\rho}{k_{zn}}V_z(k_{xn}, k_{yn}, \omega | \vec{x}^s, z_n^r)\right) \quad (2b)$$

In FIG. 6C, upgoing pressure data elements of the gather of upgoing pressure data vector 607 are inverse transformed from the frequency-wavenumber domain to the space-time domain to give a gather of upgoing pressure data 609 denoted by $p^{up}$. The downgoing pressure data elements of the downgoing pressure data vector 608 are inverse transformed from the frequency-wavenumber domain to the space-time domain to give a gather of downgoing pressure data 610 denoted by $p^{dn}$. With wavefield separation, each trace of the pressure data gather 601 is separated into corresponding traces in the upgoing pressure data gather 609 and traces in the downgoing pressure data gather 610:

$$p(\vec{x}^s, \vec{x}_n^r, t) = p^{up}(\vec{x}^s, \vec{x}_n^r, t) + p^{dn}(\vec{x}^s, \vec{x}_n^r, t) \quad (3)$$

where
$p^{up}(\vec{x}^s, \vec{x}_n^r, t)$ represents a trace of upgoing pressure data; and
$p^{dn}(\vec{x}^s, \vec{x}_n^r, t)$ represents a trace of downgoing pressure data.

The upgoing pressure data $p^{up}$ represents primary and multiple reflected pressure wavefields that travel upward from the subterranean formation toward the receivers. In other word, the upgoing pressure data $p^{up}$ comprises upgoing primaries and upgoing multiples represented by:

$$p^u(\vec{x}^s, \vec{x}_n^r, t) = p_{prim}^{up}(\vec{x}^s, \vec{x}_n^r, t) | p_{mult}^{up}(\vec{x}^s, \vec{x}_n^r, t) \quad (4)$$

where
$p_{prim}^{up}(\vec{x}^s, \vec{x}_n^r, t)$ represents a trace of upgoing primaries; and
$p_{mult}^{up}(\vec{x}^s, \vec{x}_n^r, t)$ represents a trace of upgoing multiples.
The downgoing pressure data $p^{dn}$ represents multiply-reflected pressure wavefields reflected downward from the free surface toward to the receivers.

Returning now to FIG. 5, in block 504, receiver motion correction is applied to the upgoing and downgoing pressure data to correct for receiver motion as the streamers are towed through the body of water. In block 505, after receiver motion correction, the upgoing and downgoing pressure wavefields are resampled. For example, the traces of upgoing and downgoing pressure wavefield data may be resampled to have the same sampling rate, such as a sample rate of 4 data points per millisecond. In block 506, linear noise in the resampled data is attenuated by modeling linear noise in the seismic data followed by subtracting the modeled linear noise from the resampled data. Because the receivers move during seismic data recording, the in-line and cross-line receiver locations of the traces may be irregularly spaced during recording of the seismic data. In block 507, regularization and interpolation may be applied to regularize source and receiver coordinates and interpolate missing data. Regularization corrects irregularly spaced receiver locations in the in-line and cross-lines coordinates of the traces to points of a regularly spaced grid of receiver locations in the in-line and cross-line coordinate plane. Interpolation replaces missing or corrupted data in each trace or fills in traces of upgoing and downgoing pressure wavefield at regular grid points, such as interpolating traces in the cross-line direction where receivers are spaced farther apart than in the in-line direction. In block 508, a routine "imaging of multiples by inversion" is performed to generate an image of the subterranean formation based on the upgoing and downgoing pressure wavefields.

Seismic imaging techniques approximate an acoustic wave equation that characterizes the propagation of acoustic waves through a subterranean formation. The acoustic wave equation is typically used to compute reflection events at reflection points of the subterranean formation based on a velocity model of acoustic wave propagation in the subterranean formation and recorded seismic data. Conventional depth migration techniques produce an approximation to the reflectivity of the subterranean formation denoted by an earth reflectivity model m. The earth reflectivity model m is the "seismic image" of the subterranean formation. A linear relationship between a gather of recorded seismic data $d_{obs}$ (obs represents "observed") and the seismic image m is given by:

$$d_{obs} = Lm, \quad (5)$$

where the matrix L is a two-dimensional array of operators that approximates an integral solution to the acoustic wave equation. The matrix L is a linear forward modeling operator that relates changes in reflectivity values (i.e., changes in pressure) at reflection points of the subterranean formation represented by the seismic image m to the gather of recorded seismic data $d_{obs}$.

FIG. 7A shows an expanded matrix representation of the modeling operator L in Equation (5). The recorded seismic data gather $d_{obs}$ is represented by a column vector 702 having N elements. Each element of the recorded seismic data gather $d_{obs}$ is a trace of seismic data. The seismic image m is represented by a column vector 704 with M elements. Each element, $m(\vec{x}_i)$, of the seismic image m represents a reflectivity value at a reflection point, $\vec{x}_i$, of the subterranean formation, where i=1, . . . , M and M is the number of reflection points of the subterranean formation used to create the seismic image m. An N×M matrix 706 represents the modeling operator L that relates reflectivity values at reflection points of the subterranean formation to each trace of seismic data in the recorded seismic data gather $d_{obs}$. In other words, according to Equation (5), each trace of the seismic data gather $d_{obs}$ is linearly related to M reflectivity values from the subterranean formation by $$d_{obs}(\vec{x}^s, \vec{x}_n^r, t) = \sum_{i=1}^{M} L(m_i, d_n) m(\vec{x}_i) \quad (6)$$

where $L(m_i, d_n) = g(\vec{x}^s, \vec{x}_i) g^*(\vec{x}_i, \vec{x}_n^r)$;

$g(\vec{x}^s, \vec{x}_i)$ and $g^*(\vec{x}_i, \vec{x}_n^r)$ are Green's functions; and "*" represents complex conjugation.

The matrix elements of the modeling operator L in Equation (6) are a product of Green's functions $g(\vec{x}^s, \vec{x}_i)$ and $g^*(\vec{x}^s, \vec{x}_n^r)$. A number of different Green's functions may be used to form the model operator matrix elements $L(m_i, d_n)$ in Equation (6). In one implementation, for example, the Green's functions used to form the matrix elements of the model operator may be $$g(\vec{x}^s, \vec{x}_i) = \frac{\delta(t - |\vec{x}^s - \vec{x}_i|/c)}{4\pi |\vec{x}^s - \vec{x}_i|}$$

and $$g^*(\vec{x}_i, \vec{x}_n^r) = \frac{\delta(t + |\vec{x}_i - \vec{x}_n^r|/c)}{4\pi |\vec{x}_i - \vec{x}_n^r|}$$

where $|\vec{x}^s - \vec{x}_i|$ is the distance between the source location $\vec{x}^s$ and the i-th reflection point $\vec{x}_i$; and $|\vec{x}_i - \vec{x}_n^r|$ is the distance between the i-th reflection point $\vec{x}_i$ and the n-th receiver location $\vec{x}_n^r$.

In another implementation, for example, the Green's functions used to form the matrix elements of the model operator L may be given by $$g(\vec{x}^s, \vec{x}_i) = \frac{-e^{-jk|\vec{x}^s - \vec{x}_i|}}{4\pi |\vec{x}^s - \vec{x}_i|}$$

and $$g^*(\vec{x}_i, \vec{x}_n^r) = \frac{-e^{jk|\vec{x}_i - \vec{x}_n^r|}}{4\pi |\vec{x}_i - \vec{x}_n^r|}$$

where $j=\sqrt{-1}$ is the imaginary unit; and $k=\omega/c$ and $\omega$ is the angular frequency of the seismic data.

FIG. 7B shows coordinate locations of a source, receivers, and three reflection points within the subterranean formation 120. As shown in FIG. 7B, solid ray 702 represents the ray path of acoustic energy emitted from the source 104 that reaches a first reflection point $\vec{x}_1$ 704 of the surface 122. Dot-dash line ray 706 represents the ray path of acoustic energy emitted from the source 104 that reaches a second reflection point $\vec{x}_2$ 708 of the interface 124. Dashed-line ray 710 represents the ray path of the acoustic energy emitted from the source 104 that reaches a third reflection point $\vec{x}_3$ 712 of the interface 126. Ray paths emanating from the reflection points 704, 708, and 712 represent reflected acoustic energy that is recorded in the seismic data generated by each of the N receivers.

In practice, reflections recorded in the seismic image m are unknown and determined by applying migration to the recorded seismic data. Migration is a process of reconstructing a seismic section of a subterranean formation with reflection events recorded in the seismic data repositioned under the correct surface locations and at a corrected vertical reflection time or depth. Migration improves the resolution of seismic images by focusing energy and by collapsing diffraction patterns produced by reflection points. With depth migration, the migrated reflection times are converted into reflector depths based on the velocity model. Given the recorded seismic data $d_{obs}$, migration determines the seismic image m. The reflection seismic data $d_{obs}$ can be in the space-time or the space-frequency domain. Conventional depth migration produces a seismic image by applying a migration operator to the recorded seismic data:

$$m = L^T d_{obs} \quad (7)$$

where $L^T$ is the migration operator and is determined as the conjugate transpose of the modeling operator L.

FIG. 8 shows an expanded matrix representation of a migration operator in Equation (7). An M×N matrix 802 represents the modeling operator $L^T$ that relates the recorded seismic data gather $d_{obs}$ to the reflectivity values at each reflection point of the seismic image m. The reflectivity value $m(\vec{x}_i)$ at a reflection point $\vec{x}_i$ is related to the N traces of recorded seismic data by $$m(\vec{x}_i) = \sum_{n=1}^{N} L^*(m_i, d_n) d_{obs}(\vec{x}^s, \vec{x}_n^r, t) \quad (8)$$

where $L^*(m_i, d_n) = g^*(\vec{x}^s, \vec{x}_i) g(\vec{x}^i, \vec{x}_n^r)$ is the complex conjugate of the operator $L(m_i, d_n)$.

In Equation (8), the summand may be expressed as $S(\vec{x}^s, \vec{x}_i) L^*(m_i, d_n) d_{obs}(\vec{x}^s, \vec{x}_n^r, t)$, where $S(\vec{x}^s, \vec{x}_i)$ represents a boundary source wavefield. The boundary source wavefield is not represented in Equations (7) and (8), because for an impulsive source, conventional depth migration assumes the boundary source wavefield equals one $S(\vec{x}^s, \vec{x}_i) = 1$ for all reflection points $\vec{x}_i$.

Conventional migration represented by Equations (7) and (8) produces a seismic image m of a subterranean formation from the recorded seismic data $d_{obs}$. However, because the migration operator $L^T$ in Equation (7) is not the inverse of the modeling operator L in Equation (5), the resulting seismic images typically display uneven illumination, narrow bandwidth, and limited wavenumber content.

Least squares techniques have been developed to obtain an improved approximate inverse of the modeling operator L. For example, least squares may be applied to Equation (5) to obtain a least-squares inverse of the modeling operator L given by:

$$m = (L^T L)^{-1} L^T d_{obs} \quad (9)$$

where $(L^T L)^{-1} L^T$ is the least-squares migration ("LSM") operator and is an approximate inverse of the modeling operator L.

At each subsurface location $\vec{x}_i$, the LSM solves the inverse of a minimization problem to approximate the true reflectivity as follows:

$$m = \underset{m}{\operatorname{argmin}} \frac{1}{2} \|d_{obs} - Lm\|_2^2 \qquad (10)$$

where $\|\cdot\|_2^2$ is a Euclidean norm.

In conventional LSM, multiples are treated as noise. The upgoing primaries $p_{prim}^{up}$ are separated from the upgoing multiples $p_{mult}^{up}$ in Equation (4) and the recorded seismic data $d_{obs}$ in Equation (9) is replaced by the upgoing primaries $p_{prim}^{up}$. As explained above with reference to Equations (7) and (8), for an impulsive source, the boundary source wavefield is $S(\vec{x}^s, \vec{x}_i)=1$, for all reflection points $\vec{x}_i$, which does not impact computation of the seismic image m. The least-squares migration operator in Equation (9) is typically applied to the upgoing multiples $p_{mult}^{up}$ by computing the matrix product $L^T L$ followed by computing the inverse operator $(L^T L)^{-1}$. The inverse operator $(L^T L)^{-1}$ is then applied to $L^T p_{prim}^{up}$ to obtain the seismic image m. However, this form of LSM is ill posed, because the upgoing multiples $p_{mult}^{up}$ are band limited, resulting in poor illumination.

Processes and systems that execute the routine "imaging of multiples by inversion" called in block 508 of FIG. 5 are now described. Imaging of multiples by inversion described herein is executed with the downgoing pressure wavefield $p^{dn}$ as a boundary source wavefield for the migration operator $L^T$ and the upgoing pressure wavefield $p^{up}$ as a boundary receiver wavefield.

Figure 9:
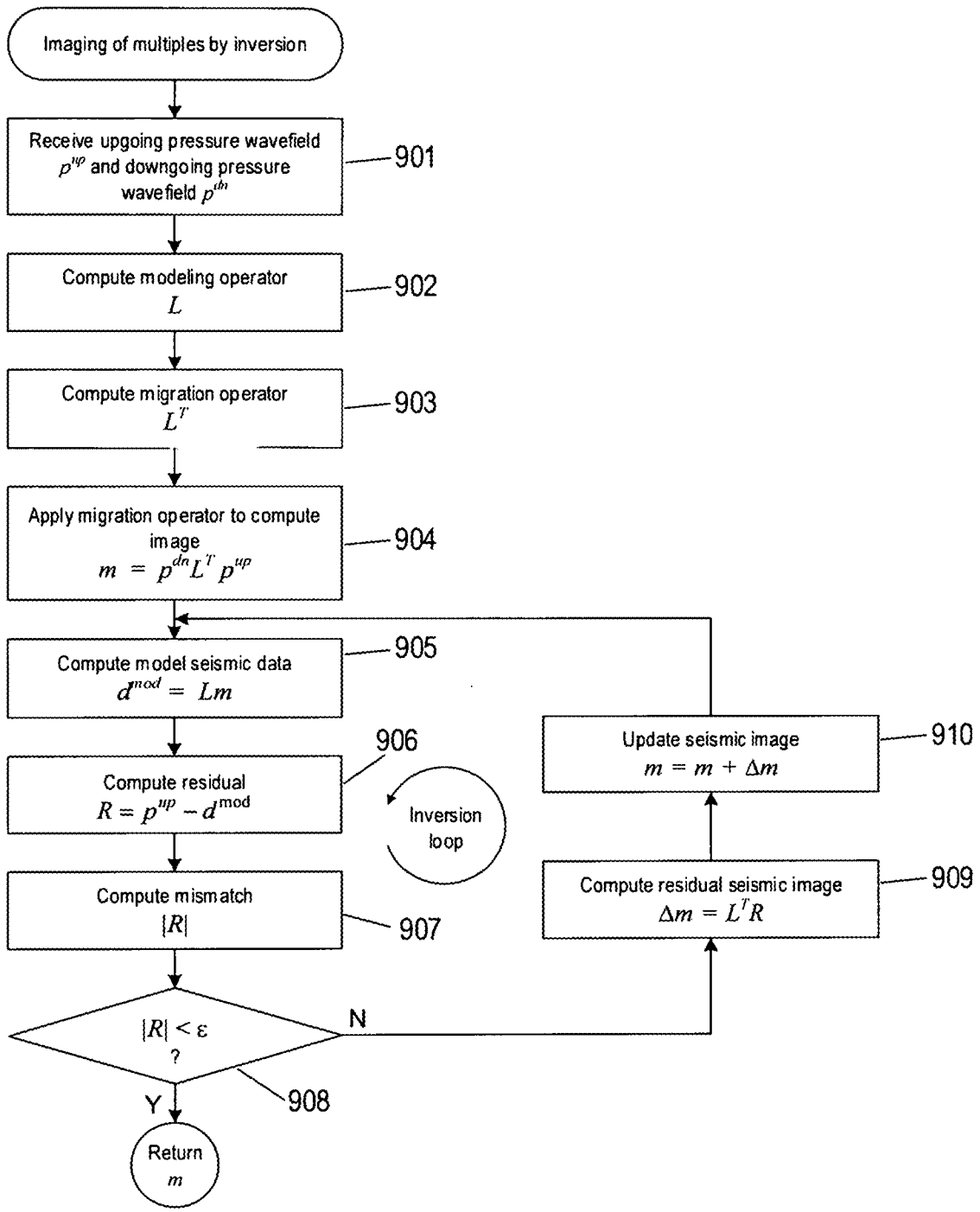
FIG. 9 shows an example control-flow diagram of the "imaging of multiples by inversion" block in FIG. 5.

FIG. 9 is a control-flow diagram illustrating an embodiment of the "imaging of multiples by inversion" block 508 of FIG. 5. In block 901, an upgoing pressure wavefield gather $p^{up}$ and a downgoing pressure wavefield gather $p^{dn}$ are received as inputs. In block 902, the modeling operator L is computed. In block 903, the conjugate transpose of the modeling operator L is computed to obtain the migration operator $L^T$.

In block 904, an initial seismic image m may be computed with the downgoing wavefield gather $p^{dn}$ as a boundary source wavefield and the upgoing wavefield gather $p^{up}$ as a boundary receiver wavefield of the migration operator $L^T$ over a grid of M reflections points. In other words, the initial seismic image m may be computed as a product of the migration operator $L^T$ applied to the upgoing wavefield gather $p^{up}$ multiplied on the left-hand side by the downgoing wavefield gather $p^{dn}$ as follows:

$$m = p^{dn} L^T p^{up} \qquad (11)$$

The reflectivity value at each reflection point of the seismic image m is given by:

$$m(\vec{x}_i) = \sum_{n=1}^{N} p^{dn}(\vec{x}^s, \vec{x}_n^r, t) L^*(m_i, d_n) p^{up}(\vec{x}^s, \vec{x}_n^r, t) \qquad (12)$$

for i=1, . . . , M.

In block 905, the modeling operator is applied to the seismic image m to compute a gather of model seismic data as follows:

$$d_{mod} = Lm \qquad (13)$$

where each trace of model seismic data in the gather $d^{mod}$ is given by:

$$d^{mod}(\vec{x}^s, \vec{x}_n^r, t) = \sum_{i=1}^{M} L(m_i, d_n) m(\vec{x}_i) \qquad (14)$$

for n=1, . . . , N.

In block 906, a residual that represents a mismatch between the upgoing pressure wavefield gather $p^{up}$ and the gather of model seismic data $d^{mod}$ is computed as follows:

$$R = p^{up} d^{mod} \qquad (15)$$

The residual R is represented as a column vector of N residual traces:

$$R(\vec{x}^s, \vec{x}_n^r, t) = p^{up}(\vec{x}^s, \vec{x}_n^r, t) - d_{mod}(\vec{x}^s, \vec{x}_n^r, t)$$

for n=1, . . . , N. Each residual trace $R(\vec{x}^s, \vec{x}_n^r, t)$ of the residual R is given by:

$$R(\vec{x}^s, \vec{x}_n^r, t_i) = p^{up}(\vec{x}^s, \vec{x}_n^r, t_i) - d^{mod}(\vec{x}^s, \vec{x}_n^r, t_i)$$

for i=0, . . . , J−1.

In block 907, a mismatch between the upgoing pressure wavefield gather $p^{up}$ and the gather of model seismic data $d^{mod}$ is computed as follows:

$$|R(\vec{x}^s, \vec{x}_n^r, t)| = \sqrt{\sum_{i=0}^{J-1} R(\vec{x}^s, \vec{x}_n^r, t_i)^2} \qquad (16)$$

In decision bock 908, the mismatch $|R(\vec{x}^s, \vec{x}_n^r, t)|$ between the upgoing pressure wavefield gather $p^{up}$ and the gather of model seismic data $d^{mod}$ is compared to a convergence threshold denoted by c. When the mismatch between the upgoing pressure wavefield gather $p^{up}$ and the gather of model seismic data $d^{mod}$ satisfies the following condition:

$$|R(\vec{x}^s, \vec{x}_n^r, t)| < \epsilon \qquad (17)$$

the seismic image m is returned as the final seismic image. On the other hand, when the mismatch between the upgoing pressure wavefield gather $p^{up}$ and the gather of model seismic data $d^{mod}$ does not satisfy the condition in Equation (17), control flows to block 909.

In block 909, the migration operator is applied to the residual of Equation (15) to compute a residual seismic image:

$$\Delta m = L^T R \qquad (18)$$

For each reflection point, $\vec{x}_i$, of the subterranean formation, a residual reflectivity value of the residual seismic image is computed as follows:

$$\Delta m(\vec{x}_i) = \sum_{n=1}^{N} L^*(m_i, d_n) R(\vec{x}^s, \vec{x}_n^r, t) \qquad (19)$$

for i=1, . . . , M.

In block 910, the seismic image m is updated by adding the residual seismic image to the most recent previously computed seismic image m as follows:

$$m = m + \Delta m \qquad (20)$$

where each reflectivity value of the seismic image m is given by:

$$m(\vec{x}_i) = m(\vec{x}_i) + \Delta m(\vec{x}_i)$$

for i=1, . . . , M. The computational operations represented by blocks 905-910 are repeated for the updated seismic image computed in block 910 according to Equation (18).

The computational operations represented by blocks 905-910 are an iterative imaging technique by inversion with an upgoing pressure wavefield $p^{up}$ that includes upgoing primaries and upgoing multiples as represented by Equation (4). When the condition of Equation (17) in decision block 908 is satisfied, the resulting seismic image m has a higher resolution with enhanced illumination and reduced crosstalk artifacts than a seismic image generated using conventional seismic imaging techniques applied to the same recorded seismic data.

Figure 10A:
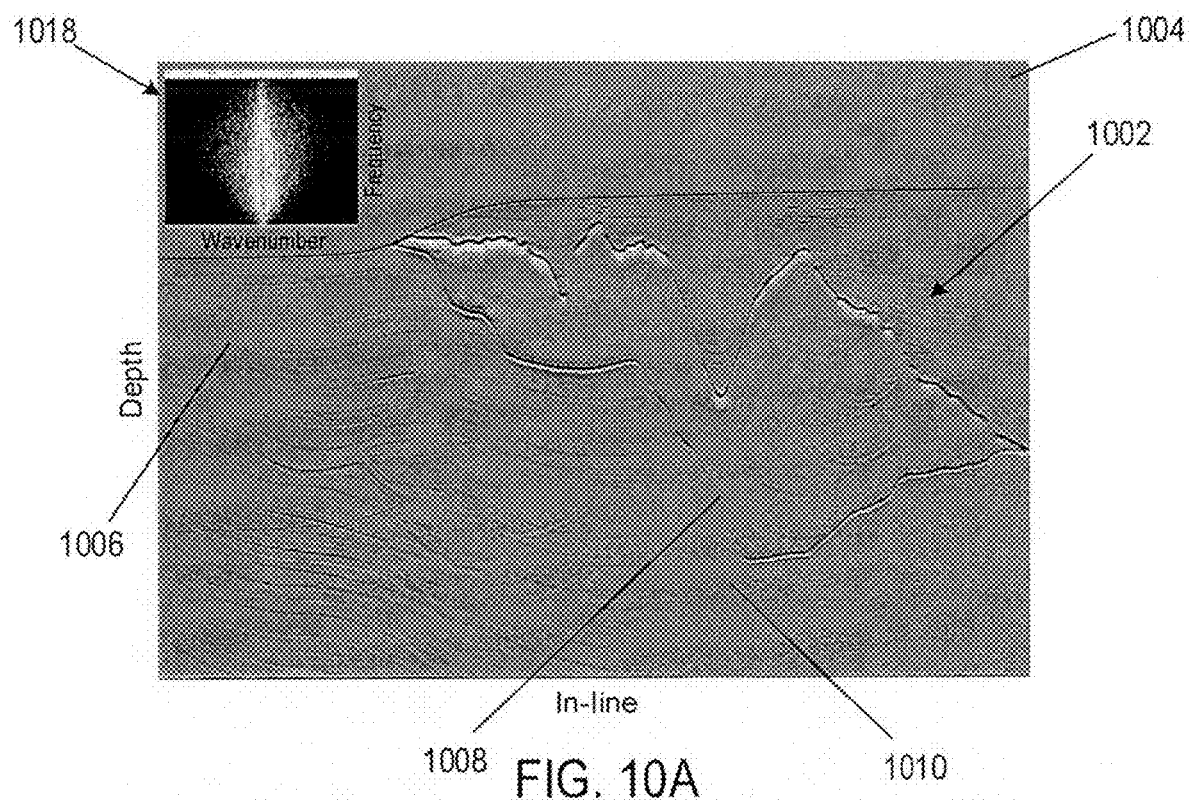
FIGS. 10A-10B show depth-inline seismic images of a salt feature computed with conventional imaging and with methods according to embodiments of the invention, respectively.
Figure 10B:
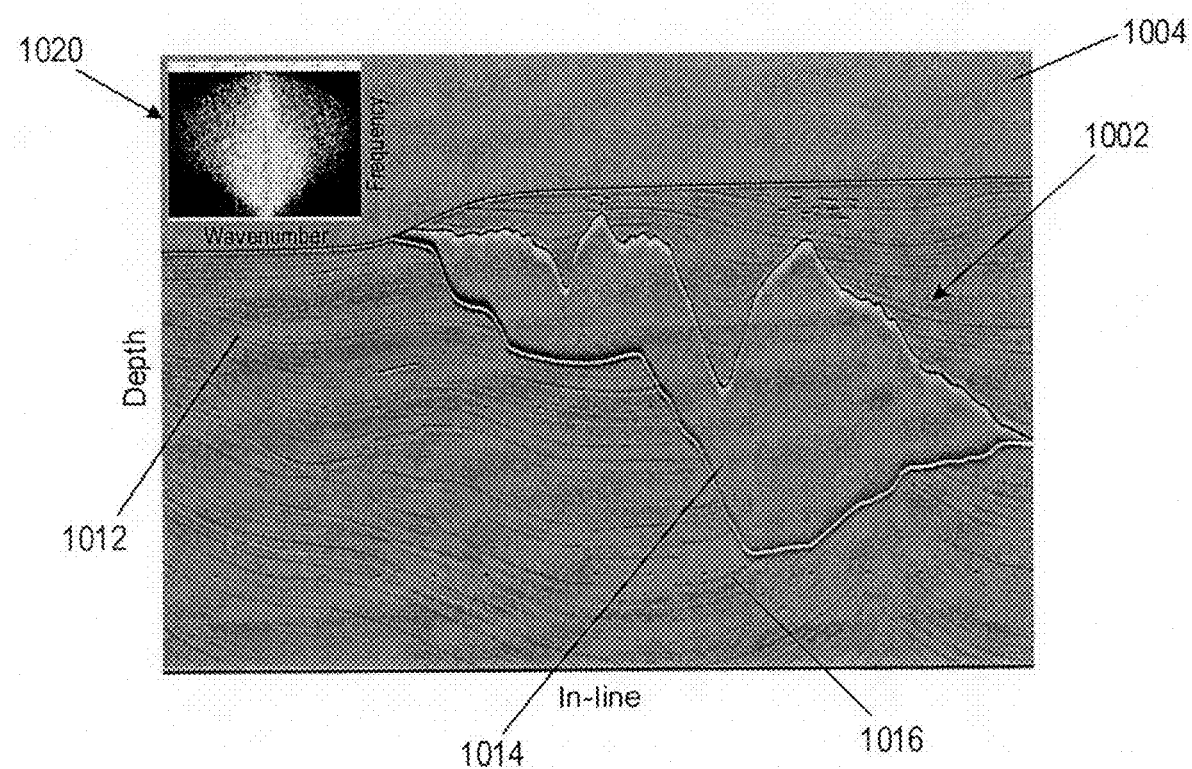

FIG. 10A shows a depth-inline seismic image of a salt feature obtained with conventional imaging applied to upgoing primaries $p_{prim}^{up}$ as described above with reference to Equation (9). FIG. 10B shows a depth-inline seismic image of the same salt feature obtained by applying imaging by inversion of multiples to the same recorded seismic data. In FIGS. 10A-10B, the salt feature 1002 is embedded in a subterranean formation located below a body of water 1004. In FIG. 10A, the seismic image exhibits uneven illumination and is contaminated by crosstalk. For example, subsurface features in regions 1006, 1008, and 1010 are not visible. By contrast, the seismic image displayed in FIG. 10B shows improved illumination and resolution over the seismic image in FIG. 10A. For example, subsurface features in regions 1012, 1014, and 1016 are visible and shadow zones located along the bottom of the salt feature 1002 in FIG. 10B are visibly defined. The overall amplitude of the seismic image in FIG. 10B is improved by comparison with the seismic image in FIG. 10A. FIGS. 10A and 10B include inset frequency-wavenumber spectra 1018 and 1020 of the corresponding seismic images. Frequency-wavenumber spectrum 1018 exhibits a narrower wavenumber content than the frequency-wavenumber spectrum 1020, which coincides with poorer overall illumination of the seismic image shown FIG. 10A as compared to the seismic image shown in FIG. 10B.

Figure 11:
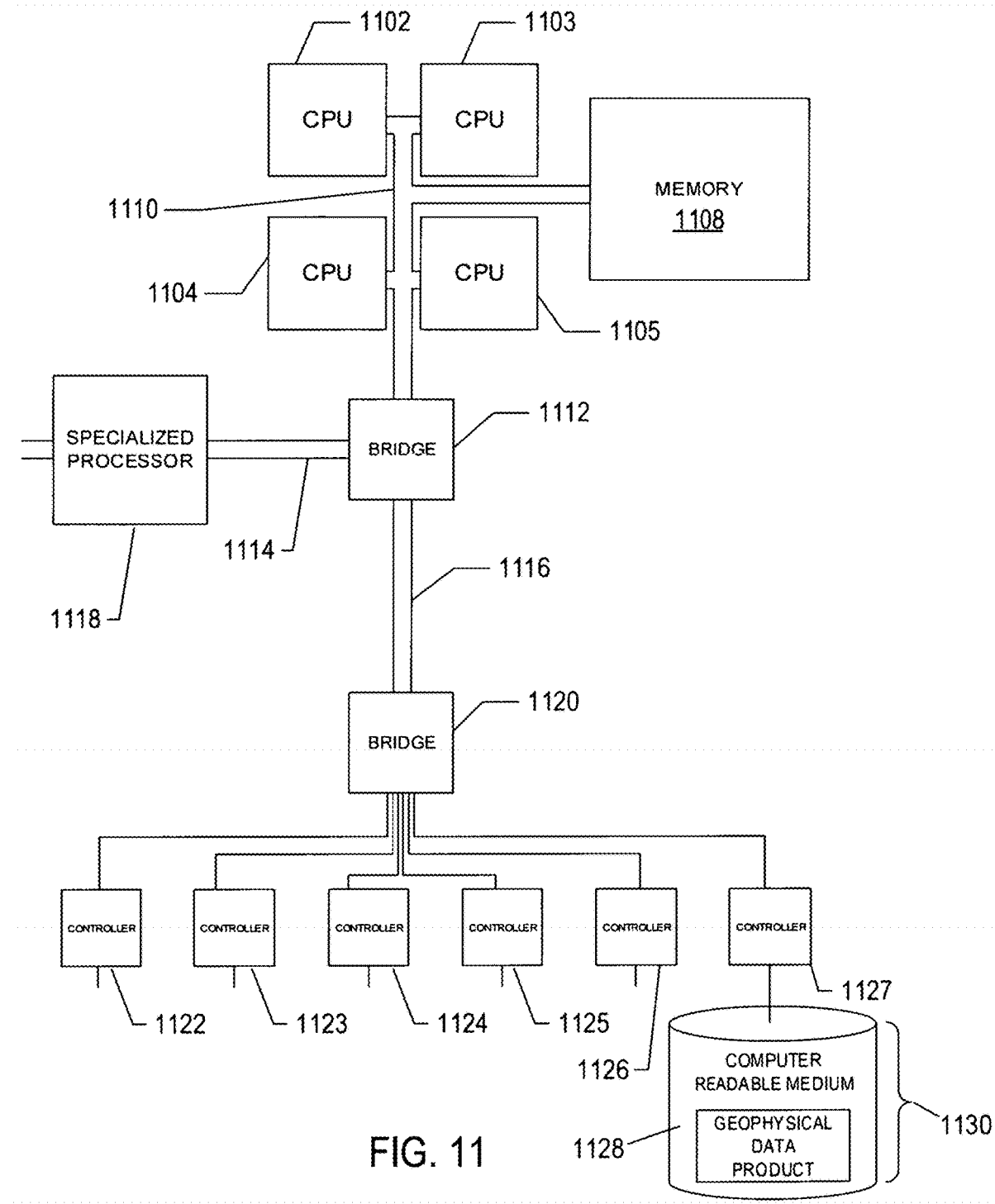
FIG. 11 shows an example of a computer system that executes an efficient process for generating a seismic image of a subterranean formation.

FIG. 11 shows an example of a computer system that executes an efficient process for generating an image of subterranean formation and therefore represents a geophysical-analysis system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1102-1105, one or more electronic memories 1208 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection media, including multiple, high-speed serial interconnects. The busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of computer-readable media, such as computer-readable medium 1128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1128 is a data-storage device and may include, for example, electronic memory, optical or magnetic disk drive, USB drive, flash memory and other such data-storage devices. The computer-readable medium 1128 can be used to store machine-readable instructions that encode the computational processes described above and can be used to store encoded data, during store operations, and from which encoded data can be retrieved, during read operations, by computer systems, data-storage systems, and peripheral devices.

The processes and systems disclosed herein may be used to form a geophysical data product 1130 indicative of certain properties of a subterranean formation. The geophysical data product 1130 may be manufactured by using the processes and systems described herein to generate geophysical data and storing the geophysical data in the computer readable medium 1128. The geophysical data product 1130 may include geophysical data such as pressure data, particle motion data, particle velocity data, particle acceleration data, upgoing and downgoing pressure wavefield data, and any seismic image of a subterranean formation computed from using the processes and systems described herein. The geophysical data product 1130 may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating a seismic image of a subterranean formation located beneath a body of water using marine seismic techniques in which one or more sources are activated in the body of water above the subterranean formation and receivers located in the body of water measure wavefield responses from the subterranean formation and store the wavefield responses as recorded pressure and vertical velocity wavefields in a data-storage device, the improvement comprising:
    separating the recorded pressure wavefield into an upgoing pressure wavefield and a downgoing pressure wavefield based on the recorded pressure wavefield and the recorded vertical velocity wavefield;
    computing a seismic image of the subterranean formation based on a product of the downgoing pressure wavefield and a migration operator applied to the upgoing pressure wavefield; and
    iteratively updating the seismic image by computing a residual seismic image based on the upgoing pressure wavefield and adding the residual seismic image to the seismic image, thereby increasing illumination and reducing crosstalk artifacts in the seismic image.

2. The process of claim 1, wherein computing the image comprises multiplying the migration operator applied to the upgoing pressure by the downgoing pressure wavefield.

3. The process of claim 1, wherein computing the image comprises using the downgoing pressure wavefield as a boundary source wavefield and the upgoing pressure wavefield as boundary receiver wavefield.

4. The process of claim 1, wherein the migration operator comprises a transpose of a forwarding modeling operator.

5. The process of claim 1, wherein iteratively updating the seismic image comprises:
applying a modeling operator to the seismic image to obtain model seismic data;
computing a residual by subtracting the model seismic data from the upgoing pressure wavefield;
computing a mismatch between the upgoing pressure wavefield and the model seismic data based on the residual;
when the mismatch is greater than a convergence threshold,
applying the migration operator to the residual to generate a residual seismic image,
updating the seismic image by adding the residual seismic image to the seismic image; and
repeating applying the modeling operator to the seismic image, computing the residual, and computing the mismatch followed by applying the migration operator to the residual and updating the seismic image until the mismatch is less than the convergence threshold.

6. A computer system for computing a seismic image of a subterranean formation from pressure wavefield and vertical velocity wavefield data recorded in a marine seismic survey of the subterranean formation, the system comprising:
one or more processors;
one or more data-storage devices; and
machine-readable instructions stored in the one or more data-storage devices that when executed using the one or more processors controls the system to carry out perform operations comprising:
separating the recorded pressure wavefield into an upgoing pressure wavefield and a downgoing pressure wavefield based on the recorded pressure wavefield and the recorded vertical velocity wavefield;
computing a seismic image of the subterranean formation based on a product of the downgoing pressure wavefield and a migration operator applied to the upgoing pressure wavefield; and
iteratively updating the seismic image by computing a residual seismic image based on the upgoing pressure wavefield and adding the residual seismic image to the seismic image, thereby increasing illumination and reducing crosstalk artifacts in the seismic image.

7. The system of claim 6, wherein computing the image comprises multiplying the migration operator applied to the upgoing pressures by the downgoing pressure wavefield.

8. The system of claim 6, wherein computing the image comprises using the downgoing pressure wavefield as a boundary source wavefield and the upgoing pressure wavefield as boundary receiver wavefield.

9. The system of claim 6, wherein the migration operator comprises a transpose of a forwarding modeling operator.

10. The system of claim 6, wherein iteratively updating the seismic image comprises:
applying a modeling operator to the seismic image to obtain model seismic data;
computing a residual by subtracting the model seismic data from the upgoing pressure wavefield;
computing a mismatch between the upgoing pressure wavefield and the model seismic data based on the residual;
when the mismatch is greater than a convergence threshold,
applying the migration operator to the residual to generate a residual seismic image,
updating the seismic image by adding the residual seismic image to the seismic image; and
repeating applying the modeling operator to the seismic image, computing the residual, and computing the mismatch followed by applying the migration operator to the residual and updating the seismic image until the mismatch is less than the convergence threshold.

11. A non-transitory computer-readable medium encoded with machine-readable instructions that implement a method carried out by one or more processors of a computer system to execute operations comprising:
separating a recorded pressure wavefield into an upgoing pressure wavefield and a downgoing pressure wavefield based on the recorded pressure wavefield and a recorded vertical velocity wavefield obtained in a marine survey of a subterranean formation;
computing a seismic image of the subterranean formation based on a product of the downgoing pressure wavefield and a migration operator applied to the upgoing pressure wavefield; and
iteratively updating the seismic image by computing a residual seismic image based on the upgoing pressure wavefield and adding the residual seismic image to the seismic image, thereby increasing illumination and reducing crosstalk artifacts in the seismic image.

12. The medium of claim 11, wherein computing the image comprises multiplying the migration operator applied to the upgoing pressure by the downgoing pressure wavefield.

13. The medium of claim 11, wherein computing the image comprises using the downgoing pressure wavefield as a boundary source wavefield and the upgoing pressure wavefield as boundary receiver wavefield.

14. The medium of claim 11, wherein the migration operator comprises a transpose of a forwarding modeling operator.

15. The system of claim 11, wherein iteratively updating the seismic image comprises:
applying a modeling operator to the seismic image to obtain model seismic data;
computing a residual by subtracting the model seismic data from the upgoing pressure wavefield;
computing a mismatch between the upgoing pressure wavefield and the model seismic data based on the residual;
when the mismatch is greater than a convergence threshold,
applying the migration operator to the residual to generate a residual seismic image,
updating the seismic image by adding the residual seismic image to the seismic image; and
repeating applying the modeling operator to the seismic image, computing the residual, and computing the mismatch followed by applying the migration operator to the residual and updating the seismic image until the mismatch is less than the convergence threshold.

16. An apparatus for generating an image of a subterranean formation from recorded seismic data collected in a marine seismic survey of the subterranean formation, the apparatus comprising:

means for separating a recorded pressure wavefield into an upgoing pressure wavefield and a downgoing pressure wavefield based on the recorded pressure wavefield and a recorded vertical velocity wavefield obtained in a marine survey of a subterranean formation;

means for computing a seismic image of the subterranean formation based on a product of the downgoing pressure wavefield and a migration operator applied to the upgoing pressure wavefield; and means for iteratively updating the seismic image by computing a residual seismic image based on the upgoing pressure wavefield and adding the residual seismic image to the seismic image, thereby increasing illumination and reducing crosstalk artifacts in the seismic image.

17. The medium of claim 11, wherein the means for computing the image comprises multiplies the migration operator applied to the upgoing pressure by the downgoing pressure wavefield.

18. The medium of claim 11, wherein the means for computing the image comprises using the downgoing pressure wavefield as a boundary source wavefield and the upgoing pressure wavefield as a boundary receiver wavefield.

19. The medium of claim 11, wherein the migration operator comprises a transpose of a forwarding modeling operator.

20. The system of claim 11, wherein the means for iteratively updating the seismic image comprises:

applies a modeling operator to the seismic image to obtain model seismic data;

computing a residual by subtracting the model seismic data from the upgoing pressure wavefield;

computes a mismatch between the upgoing pressure wavefield and the model seismic data based on the residual;

when the mismatch is greater than a convergence threshold, applies the migration operator to the residual to generate a residual seismic image, updates the seismic image by adding the residual seismic image to the seismic image; and repeats application of the modeling operator to the seismic image, computation of the residual, and computation of the mismatch followed by application of the migration operator to the residual and updates the seismic image until the mismatch is less than the convergence threshold.

21. A method of manufacturing a geophysical data product, the method comprising:

separating a recorded pressure wavefield into an upgoing pressure wavefield and a downgoing pressure wavefield based on the recorded pressure wavefield and a recorded vertical velocity wavefield obtained in a marine survey of a subterranean formation;

computing a seismic image of the subterranean formation based on a product of the downgoing pressure wavefield and a migration operator applied to the upgoing pressure wavefield;

iteratively updating the seismic image by computing a residual seismic image based on the upgoing pressure wavefield and adding the residual seismic image to the seismic image, thereby increasing illumination and reducing crosstalk artifacts in the seismic image; and storing the seismic image in a tangible computer-readable medium.

* * * * *